(12) United States Patent
Larson et al.

(10) Patent No.: US 10,285,906 B2
(45) Date of Patent: May 14, 2019

(54) RFID TAG AND BLOOD CONTAINER/SYSTEM WITH INTEGRATED RFID TAG

(71) Applicant: Fenwal, Inc., Lake Zurich, IL (US)

(72) Inventors: Christine Larson, Fox Lake, IL (US); Bryan Blickhan, Oberursel (DE); Carlos Calderon, Waukegan, IL (US); Daniel Lynn, Spring Grove, IL (US); Senan Ozbag, Elk Grove Village, IL (US); W. Timothy Watts, Lake Forest, IL (US); Daryl R. Calhoun, Gurnee, IL (US)

(73) Assignee: Fenwal, Inc., Lake Zurich, IL (US)

( * ) Notice: Subject to any disclaimer, the term of this patent is extended or adjusted under 35 U.S.C. 154(b) by 0 days.

(21) Appl. No.: 15/066,189

(22) Filed: Mar. 10, 2016

(65) Prior Publication Data

US 2016/0184184 A1    Jun. 30, 2016

Related U.S. Application Data

(62) Division of application No. 14/512,741, filed on Oct. 13, 2014, now Pat. No. 9,345,637, which is a division
(Continued)

(51) Int. Cl.
*A61B 19/00* (2006.01)
*A61J 1/18* (2006.01)
(Continued)

(52) U.S. Cl.
CPC . *A61J 1/18* (2013.01); *A61J 1/10* (2013.01); *G06K 19/0723* (2013.01);
(Continued)

(58) Field of Classification Search
CPC .... B65D 23/14; B65D 39/00; B65D 2203/10; A61J 1/05; A61J 1/14; A61J 1/1406; A61J 1/1412; A61J 1/1475; A61J 2205/60
See application file for complete search history.

(56) References Cited

U.S. PATENT DOCUMENTS 5,493,805 A    2/1996    Penuela et al.
5,635,917 A    6/1997    Todman
(Continued)

FOREIGN PATENT DOCUMENTS

DE    102010020374 A1    11/2011
EP    0586083 A2    3/1994
(Continued)

OTHER PUBLICATIONS

Notification of Transmittal of the International Search Report, International Search Report and Written Opinion for PCT/US2013/041131 dated Aug. 30, 2013.
(Continued)

*Primary Examiner* — Ariana Zimbouski
(74) *Attorney, Agent, or Firm* — Cook Alex Ltd.

(57) ABSTRACT

The present disclosure relates to arrangements for attaching an RFID tag to a liquid container, and particularly to a blood components container. The RFID tag may be inserted in an enclosure, such as peel tab, or in a sealed cup attached to a container port. The tag could alternately be embedded in a molded plug or component attached to a port. The RFID antenna could be painted or stamped on the surface of the container. Or the tag could be inserted into the container to float freely in the liquid components. The RFID source may be secured around the neck of a rigid or semi-rigid container, attached with a tether or attached to a connector assembled in association with a blood component or other fluid flow path.

13 Claims, 6 Drawing Sheets

Related U.S. Application Data of application No. 13/788,734, filed on Mar. 7, 2013, now Pat. No. 9,579,253.

(60) Provisional application No. 61/723,928, filed on Nov. 8, 2012.

(51) Int. Cl.
   *A61J 1/10*   (2006.01)
   *G06K 19/07*  (2006.01)
   *A61J 1/06*   (2006.01)
   *A61J 1/14*   (2006.01)
   *A61J 1/20*   (2006.01)

(52) U.S. Cl.
   CPC .............. *A61J 1/065* (2013.01); *A61J 1/1406* (2013.01); *A61J 1/2089* (2013.01); *A61J 2205/60* (2013.01)

(56) References Cited

U.S. PATENT DOCUMENTS

| | | | |
|---|---|---|---|
| 5,949,335 A | 9/1999 | Maynard | |
| 5,973,598 A | 10/1999 | Beigel | |
| 5,980,501 A | 11/1999 | Gray | |
| 6,040,773 A | 3/2000 | Vega et al. | |
| 6,285,285 B1 * | 9/2001 | Mongrenier | A61J 1/10 235/435 |
| 6,861,954 B2 | 3/2005 | Levin | |
| 6,980,111 B2 | 12/2005 | Nolte | |
| 6,983,884 B2 | 1/2006 | Auchinleck | |
| 7,209,045 B2 | 4/2007 | De Gaulle et al. | |
| 7,256,696 B2 | 8/2007 | Levin | |
| 7,450,012 B2 | 11/2008 | Harmon | |
| 7,575,936 B2 | 8/2009 | De Gaulle et al. | |
| 7,701,334 B1 | 4/2010 | Perkins et al. | |
| 7,703,687 B2 | 4/2010 | Barczyk et al. | |
| 7,772,981 B1 * | 8/2010 | Lambert | B65D 47/0842 340/539.1 |
| 7,776,601 B2 | 8/2010 | De Gaulle et al. | |
| 7,782,212 B2 | 8/2010 | Burns et al. | |
| 7,927,313 B2 | 4/2011 | Stewart et al. | |
| 7,969,308 B2 | 6/2011 | Cotton | |
| 7,976,508 B2 | 7/2011 | Hoag | |
| 7,982,612 B2 | 7/2011 | Braun | |
| 8,113,007 B2 | 2/2012 | Zenobi et al. | |
| 8,228,200 B2 | 7/2012 | Kolton et al. | |
| 8,267,326 B2 | 9/2012 | Kolton et al. | |
| 8,327,561 B1 | 12/2012 | Smith, III | |
| 8,368,539 B2 | 2/2013 | Adstedt et al. | |
| 9,345,637 B2 | 5/2016 | Larson | |
| 2002/0185544 A1 * | 12/2002 | Baillod | B65D 39/0011 235/494 |
| 2003/0072676 A1 | 4/2003 | Fletcher-Haynes et al. | |
| 2003/0183683 A1 | 10/2003 | Stewart | |
| 2004/0078022 A1 * | 4/2004 | Donart | A61J 1/05 604/408 |
| 2007/0036686 A1 | 2/2007 | Hatamian et al. | |
| 2007/0145150 A1 | 6/2007 | Barczyk et al. | |
| 2007/0151984 A1 * | 7/2007 | Baker | A61J 1/2089 222/129 |
| 2008/0104993 A1 | 5/2008 | Zenobi et al. | |
| 2008/0185838 A1 | 8/2008 | Sudar | |
| 2008/0208750 A1 | 8/2008 | Chen | |
| 2008/0230509 A1 | 9/2008 | Koo et al. | |
| 2008/0238675 A1 | 10/2008 | Yang | |
| 2009/0306620 A1 | 12/2009 | Thilly et al. | |
| 2009/0315717 A1 | 12/2009 | Soomro et al. | |
| 2010/0005840 A1 | 1/2010 | Hogan et al. | |
| 2010/0036755 A1 | 2/2010 | Saghbini | |
| 2010/0133224 A1 | 6/2010 | Kolton et al. | |
| 2010/0245056 A1 * | 9/2010 | Braun | A61J 1/1406 340/10.42 |
| 2010/0253524 A1 | 10/2010 | Kolton et al. | |
| 2010/0270381 A1 | 10/2010 | Baba et al. | |
| 2010/0294693 A1 * | 11/2010 | Lynn | A61J 1/10 206/484 |
| 2010/0315205 A1 | 12/2010 | Egbert | |
| 2011/0074583 A1 | 3/2011 | Kolton et al. | |
| 2011/0257576 A1 | 10/2011 | Simpson et al. | |
| 2011/0257578 A1 | 10/2011 | Zanotti et al. | |
| 2012/0024962 A1 | 2/2012 | Kolton et al. | |
| 2012/0025985 A1 | 2/2012 | Bolander et al. | |
| 2012/0150091 A1 | 6/2012 | Roger et al. | |
| 2012/0223145 A1 * | 9/2012 | Stewart | G06K 19/04 235/488 |
| 2012/0228388 A1 | 9/2012 | Kuo et al. | |
| 2012/0292399 A1 | 11/2012 | Launiainen | |
| 2013/0012912 A1 | 1/2013 | Suzuki et al. | |
| 2014/0128832 A1 | 5/2014 | Larson | |

FOREIGN PATENT DOCUMENTS

| | | |
|---|---|---|
| EP | 0712102 A1 | 5/1996 |
| EP | 1076546 B1 | 2/2001 |
| EP | 1083519 A2 | 3/2001 |
| EP | 1926034 A1 | 5/2008 |
| EP | 2119410 A1 | 11/2009 |
| EP | 2249327 A1 | 11/2010 |
| EP | 2386356 A1 | 11/2011 |
| GB | 2288103 A | 10/1995 |
| JP | 2007267869 A | 10/2007 |
| WO | WO 95/15622 A1 | 6/1995 |
| WO | WO 99/56696 A1 | 11/1999 |
| WO | WO 00/42969 | 7/2000 |
| WO | WO 00/58901 A1 | 10/2000 |
| WO | WO 02/45777 A1 | 6/2002 |
| WO | WO 02/088897 A2 | 11/2002 |
| WO | WO 2005/109332 A1 | 11/2005 |
| WO | WO 2007/042879 A2 | 4/2007 |
| WO | WO 2008/077990 A1 | 7/2008 |
| WO | WO 2009/087374 A1 | 7/2009 |
| WO | WO 2012/017275 A1 | 2/2012 |

OTHER PUBLICATIONS

International Preliminary Report on Patentability for International Application No. PCT/US2013/041131 dated May 12, 2015.
Extended European Search Report dated Sep. 2, 2016 for EP application No. 16167786.9.
European Search Report and Annex to the European Search Report for Appl. No. EP 17201553 dated Feb. 19, 2018.

* cited by examiner

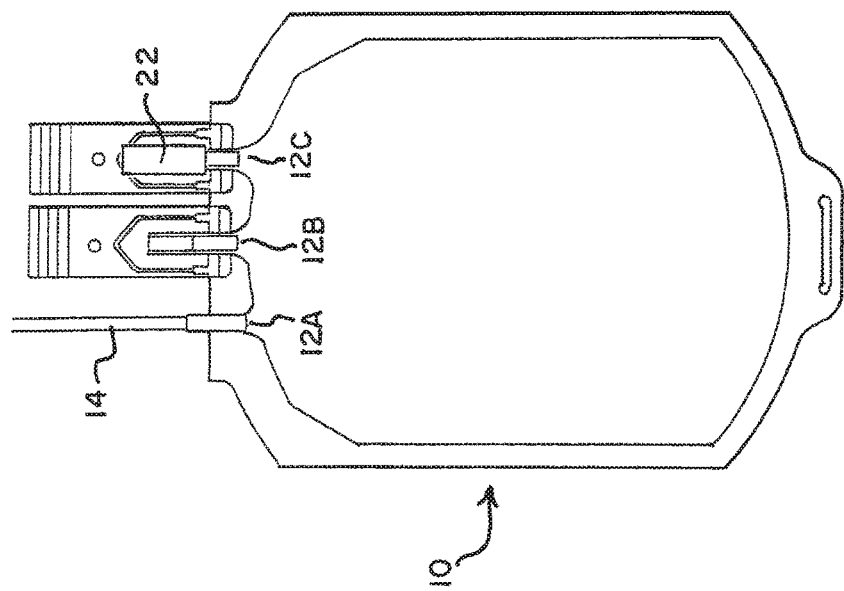
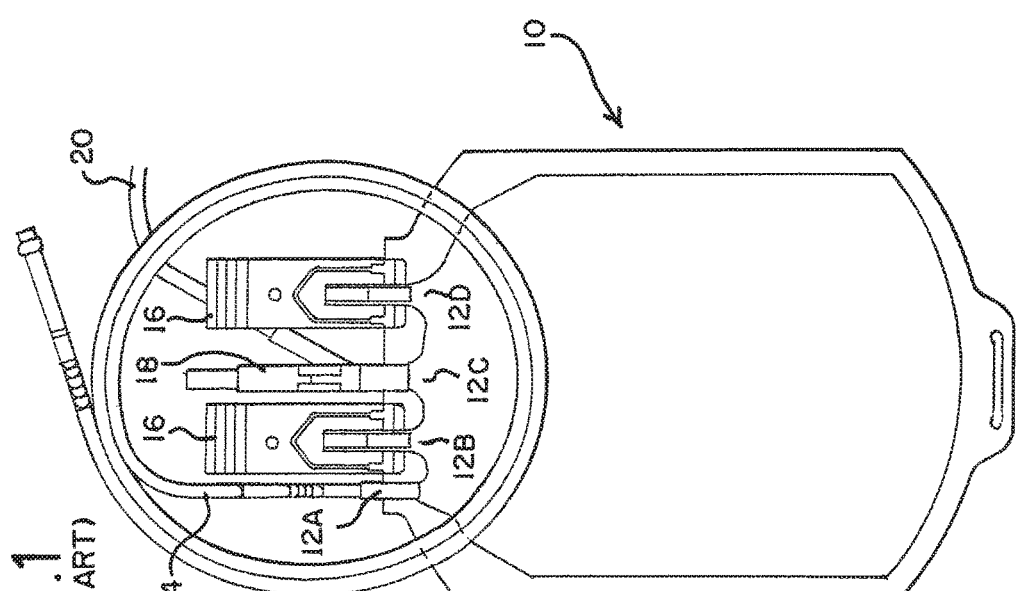

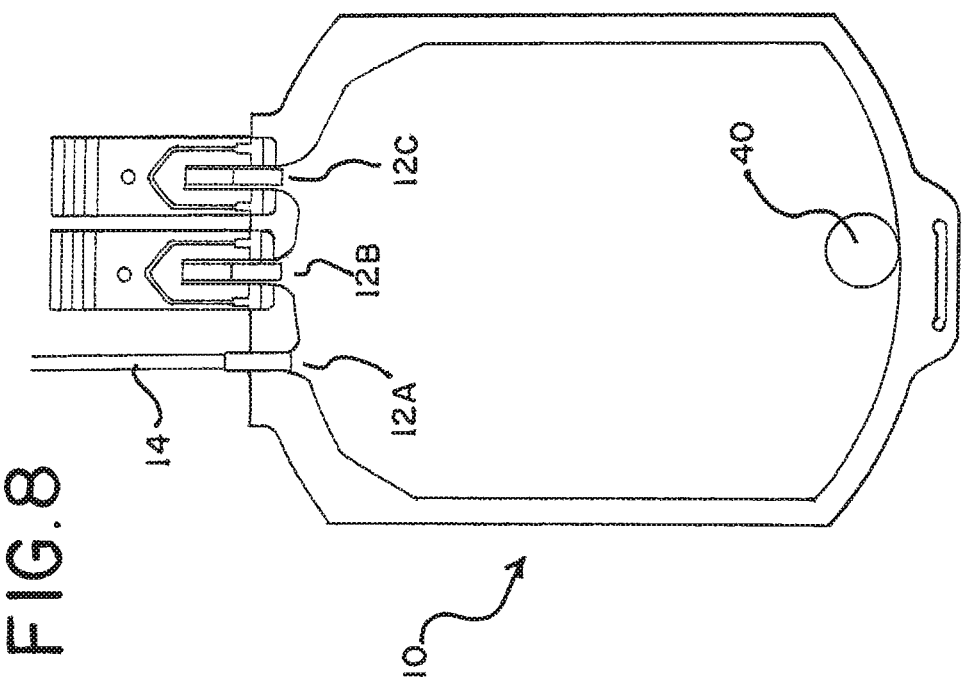
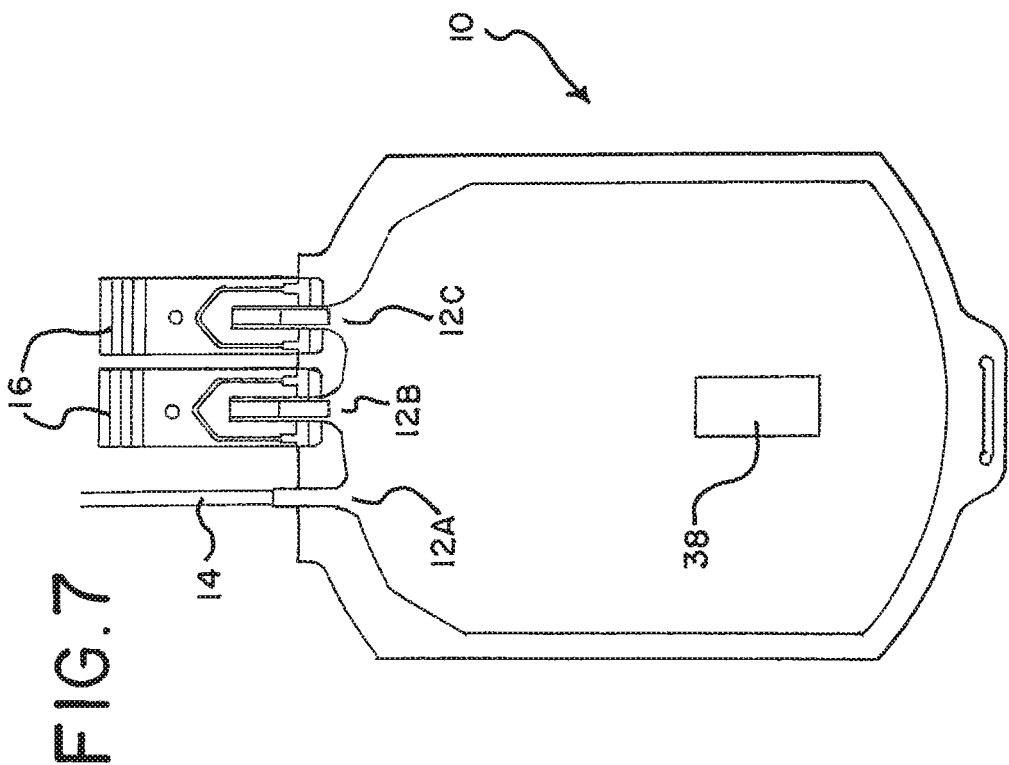

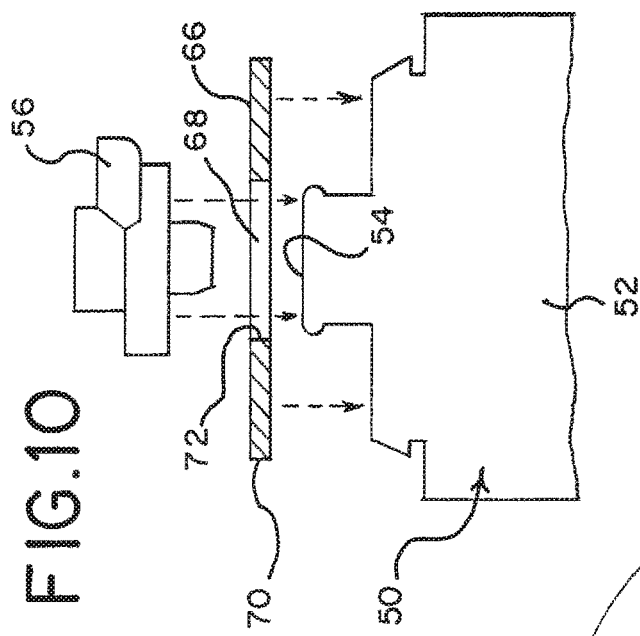
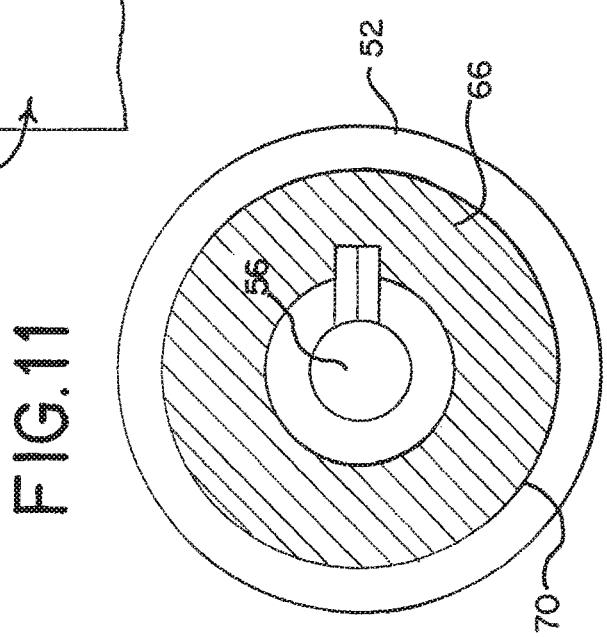
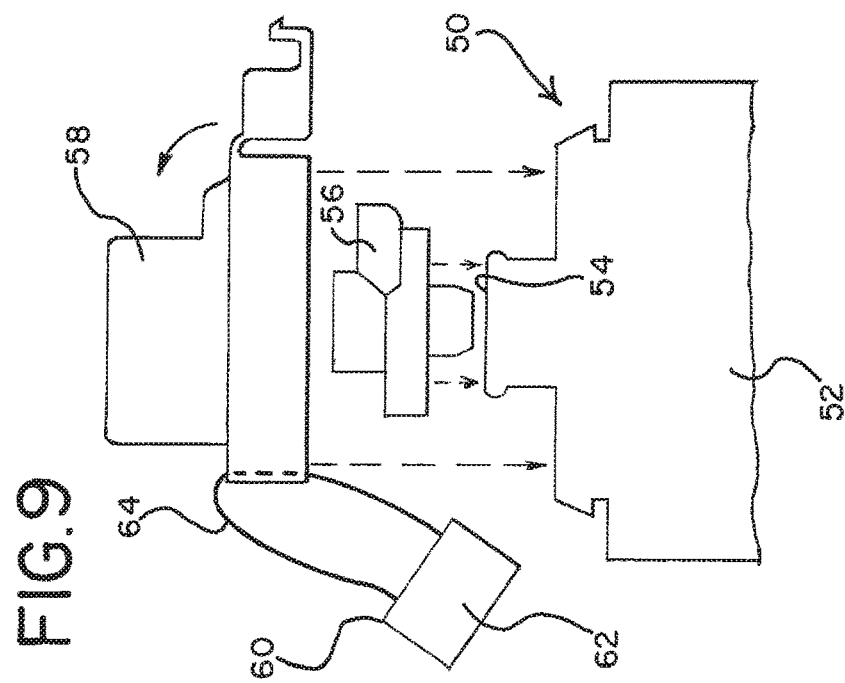

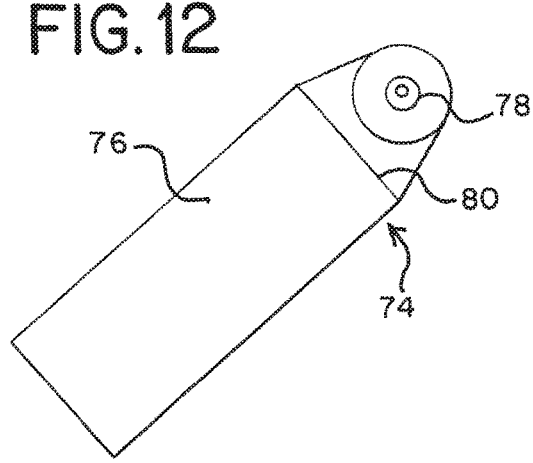
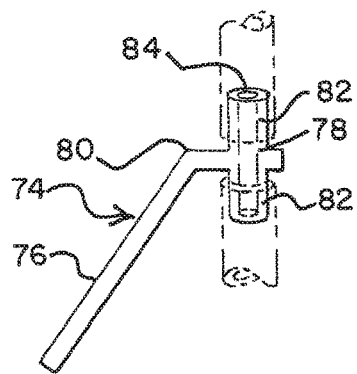
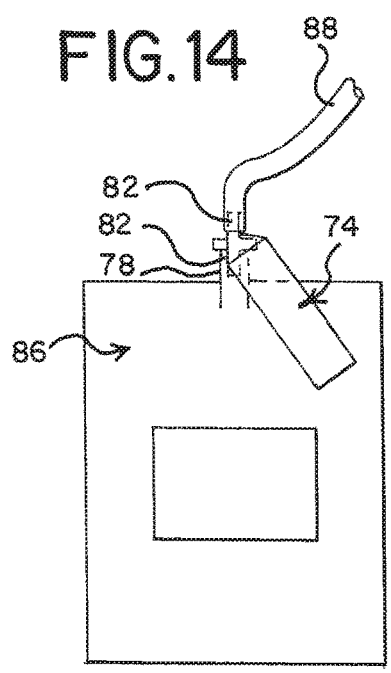
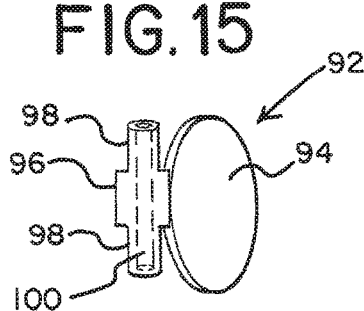
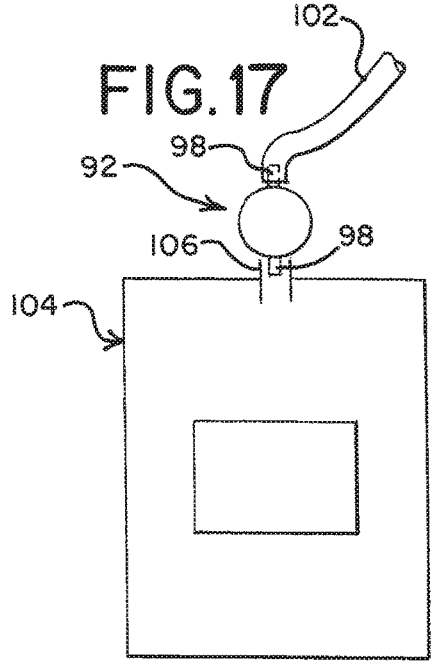
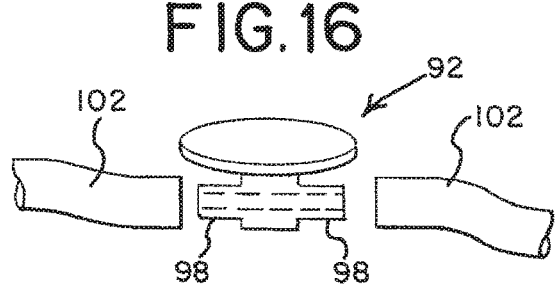

RFID TAG AND BLOOD CONTAINER/SYSTEM WITH INTEGRATED RFID TAG

This application is a division of pending U.S. patent application Ser. No. 14/512,741, filed Oct. 13, 2014 which is a division of pending U.S. patent application Ser. No. 14/788,734, filed Mar. 7, 2013, which claims priority to and the benefit of U.S. Provisional Patent Application Ser. No. 61/723,928, filed Nov. 8, 2012, all of which are hereby incorporated by reference herein.

The present disclosure relates to blood containers and processing systems. More particularly, the present disclosure relates to a blood or blood component container and/or to a blood or blood component flow system having a radio-frequency identification (RFID) source or tag associated therewith.

BACKGROUND

A disposable plastic container and tubing set is typically used for collecting blood or blood components from a donor. For many years such containers have incorporated labels containing bar codes that include a description of the container type and the product code information assigned by the U.S. Food and Drug Administration for the intended contents of the container, for example whole blood, red blood cells or platelets or other components. There are significant limitations to bar code labels. Among these is the requirement that a bar code be in the line of sight of a scanner. Not only does this mean that each individual bar code must be made accessible to the scanner, but also the bar code itself cannot be degraded or obscured in any way. Since the bar codes are susceptible to being folded or crumpled, a technician is often required to manually straighten or smooth them out to make them readable. Also, the labels on frozen blood containers can become encrusted with ice, which can make the bar code unreadable.

It has been previously generally proposed to use radio frequency identification ("RFID") tags with blood bags for tracking purposes and to avoid some of the drawbacks associated with barcode labels. For purposes of this description, RFID "tag" is used in accordance with its well-known and ordinary meaning, in which it includes a microcircuit or microchip combined with an antenna, allowing it and the object to which it is attached to be tracked via wireless communication. RFID "data source" may be used interchangeably with RFID "tag" herein, and no distinction is intended.

Turning back to the discussion, there have been issues with the use of RFID tags in connection with blood containers. First, the tag must adhere to the international ISBT 128 data integrity standard governing blood bag labeling. Second, the tag cannot create a risk of contaminants leaching into the blood. Third, the tag must survive for long durations at a wide temperature range, including steam sterilization, pasteurization and/or long periods at sub-freezing temperatures. These requirements make the incorporation of an RFID tag in a blood container a non-trivial matter.

It has been suggested that if an RFID tag is simply adhered in a flat planar configuration on the blood container, the fluid in the container will absorb the electromagnetic waves, rendering communication between the RFID tag and the reader/writer unreliable or impossible. See U.S. Pat. No. 7,703,687, which is incorporated by reference herein. Furthermore, since the blood container is typically soft and pliable, if the RFID tag is simply adhered on the blood container, ordinary handling of the blood container has a tendency to flex the RFID tag and may cause separation of the tag's antenna from the rest of the tag's circuit. The U.S. Pat. No. 7,703,687 patent addresses these issues by using a stand-off mounting label that has a mounting part for adhering to the container and a holding part foldably connected to the mounting part. The holding part mounts the RFID tag and can be flexed to dispose the tag in a plane separate from that of the mounting part.

Other arrangements for securing an RFID tag to a blood container are shown in U.S. Pat. No. 6,285,285, also hereby incorporated by reference. Several of these entail placing the RFID tag directly on the body of the container, with the tag either held in its own bag or retained by film layers attached to the container walls. The U.S. Pat. No. 6,285,285 patent also shows extensions of the container walls forming a compartment for receiving the tag.

SUMMARY

The present disclosure is directed to RFID tags and systems or combinations in which RFID tags are associated with blood or blood component containers and/or with blood or blood component fluid flow or processing systems, whether by affixing the tag on or to or in the container or otherwise providing a physical connection between the tag and the container or the tag and a portion of the blood or blood component flow system. As used hereinafter, no distinction is intended between "blood container" and "blood component container" unless expressly set forth, and "blood container" will include "blood component container" unless expressly noted otherwise. Similarly, no distinction is intended between blood or blood component processing systems or flow paths.

Several embodiments are disclosed herein that include a blood container in which the RFID tag is associated with the container in various ways, including: inserting the tag inside the port protecting peel tab on the blood container; embedding the tag in a molded plug inserted in port of the blood container; attaching the tag to a molded component such as a breakaway cannula inserted in a port of the blood container; placing the tag inside a cup-shaped port, securing the port with a plug and attaching it to a port of the blood container; painting or stamping the RFID tag antenna directly on the sheeting of the blood container; or inserting the tag into the blood container to float freely in the liquid components when filled. Other embodiments or arrangements disclosed include blood containers or systems in which the RFID tag is attached to a blood container or processing system by a tether or by capturing the RFID tag between the container body and a cover, cap or connector. Yet other embodiments include an RFID tag that includes a connector configured for attachment inline in a fluid flow path associated with a blood or blood component container or blood or blood component processing system.

In one aspect of the present subject matter, a blood component container assembly includes a rigid or semi-rigid blood component container comprising a body, a neck extending from the body and terminating in a port, and a connector mounted in association with the port, and an RFID tag secured to the container.

In another aspect of the present subject matter, a blood component container assembly includes a flexible blood component container, a generally tubular member, such as a port tube, extending from the container, and an RFID tag located within the tubular member.

In a further aspect of the present subject matter, a blood component container assembly comprises a flexible flood component container, an enclosure formed by peel tabs carried by the container, and an RFID tag enclosed within the enclosure, and the peel tabs are manually openable to allow access to the RFID tag.

In yet another aspect of the present subject matter, a blood component container has a wall with an exterior surface, and an RFID antenna is painted, printed or stamped directly onto the exterior surface.

In another aspect of the present subject matter, a blood component container assembly includes a blood component container having an internal chamber for receiving a blood component and an RFID tag located within the chamber.

In a still further aspect of the present subject matter, a blood component container assembly includes a blood component container and an RFID tag secured to the container by a tether.

In another aspect of the present subject matter, an RFID tag for tracking a blood component is provided that includes an RFID scan component and a tether for permanently attaching the scan component to a product.

In another aspect of the present subject matter, an RFID tag is provided for use in association with a blood component flow path, the tag includes a connector having a fluid flow lumen extending therethrough for in-line connection in a fluid flow path and an RFID read portion carried by the port connector.

These but some of the general and/or more specific aspects or examples of the present subject matter disclosed and claimed herein and are not intended to be comprehensive or exclusive of other aspects.

BRIEF DESCRIPTION OF THE FIGURES

FIG. 1 is a plan view of a prior art blood container.

FIG. 2 is a plan view similar to FIG. 1 but on a smaller scale, showing a first embodiment according to the present subject matter.

FIG. 7 is a plan view of a blood container, illustrating yet another alternate embodiment of the subject matter.

FIG. 8 is a plan view of a blood container, illustrating a further alternate embodiment of the subject matter.

FIG. 9 is a partial side elevation exploded view of another embodiment of RFID tag attached to a plasma collection container.

FIG. 10 is a partial side elevation exploded view of yet another embodiment of RFID tag being attached to a plasma collection container.

FIG. 11 is a top view of the assembled apparatus of FIG. 10.

FIG. 12 is plan view of a still further embodiment of an RFID tag that includes a fluid flow connector.

FIG. 13 is a side view of the RFID tag of FIG. 12 attached inline in fluid flow tubing of, for example, a blood collection or processing flow circuit.

FIG. 14 illustrates the embodiment of FIG. 12 assembled in-line between blood component container port and a tubing segment.

FIG. 15 illustrates another RFID tag that includes a fluid flow connector.

FIG. 16 illustrates the embodiment of FIG. 15 attached inline in fluid flow tubing of a blood processing or, for example, a blood collection or processing flow circuit.

FIG. 17 illustrates the embodiment of FIG. 15 inline between a container, such as a blood or blood component container, and a tubing segment.

DETAILED DESCRIPTION

Figure 3:
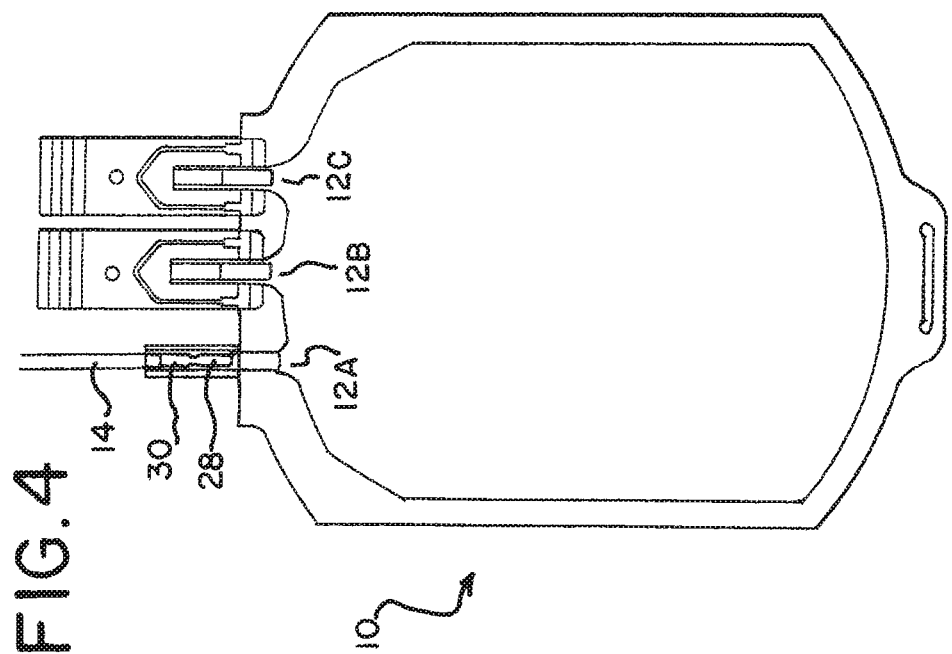
FIG. 3 is a plan view similar to FIG. 2, illustrating an alternate embodiment of the subject matter.

For purposes of this description a blood container is illustrated generally at 10 in FIG. 1. This is intended to represent a typical blood component container. It should be noted that the present subject matter may be used on blood component containers that are employed with manual collection of blood components, either primary or satellite containers, or may be used in connection with blood component containers employed in automated systems. For that matter, the container may contain any fluid contents that need to be identified and tracked by an RFID tag. For purposes of description these will be referred to herein as blood containers, though it will be understood that the contents could be other than blood or blood components.

The manufacture of blood containers is well known to those skilled in the field. Typically blood containers are made of a suitable plastic material, such as plasticized polyvinyl chloride. The container is formed by sealing together opposed sheets of plastic material or forming the container by blow molding or other plastic forming process. The present subject matter does not depend on how the container is formed.

FIG. 1 illustrates a blood container 10 which is of conventional construction. The container 10 comprises a pair of facing plastic sheets peripherally sealed together to define the interior chamber of the container. One or more ports are provided at the end of the container for accessing the interior of the container. In FIG. 1 there are four ports, 12A, 12B, 12C and 12D. Obviously different numbers of ports could be provided (the other figures herein show containers having three ports). The ports may directly open into the container or may include a piercable diaphragm or a frangible obstruction located within the port, which can be opened by a user's external manipulation to break the frangible obstruction and open flow through the port. Port 12A is shown connected to suitable tubing 14. Ports 12B and 12D are sealed within an enclosure formed by what is conventionally referred to as peel tabs 16. Port 12C joins a connector 18 suitable for attachment to additional tubing shown at 20.

FIG. 2 illustrates one embodiment of the present subject matter. It shows a three-port blood container with an RFID tag shown schematically at 22. It will be understood that the RFID tag 22 includes an antenna connected to a suitable circuit device for communicating with an RFID scanner/reader unit (not shown). "Scanner" and "reader" are used interchangeably herein. In this embodiment the RFID tag 22 is inserted inside a peel tab 16 surrounding port 12C. The peel tab secures the tag 22 to the container and protects the tag from damage while not interfering with its operation. If for some reason the tag 22 needs to be separated from the container, e.g., to include in a patient or donor's file, the peel tab can be opened to remove the tag.

Figure 4:
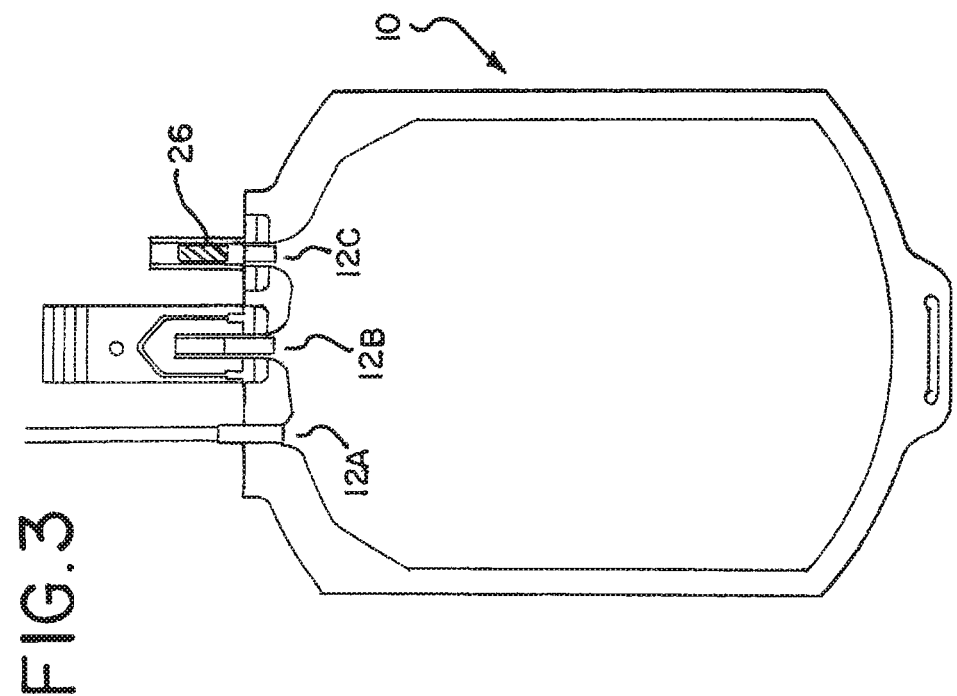
FIG. 4 is a plan view of a blood container, illustrating a further alternate embodiment of the present subject matter.

FIGS. 3 and 4 illustrate related further embodiments of the present subject matter. Both of these embodiments incorporate an RFID tag that is embedded in or attached to a molded plug or molded component (e.g., a breakaway cannula) which is inserted in a port of the blood container. In FIG. 3 the RFID tag 24 is embedded in a molded plug 26 inserted in port 12C. In FIG. 4 the RFID tag 28 is attached to a breakaway cannula 30 inserted in port 12A. Both of these embodiments provide a particularly robust support for the tag.

Figure 6:
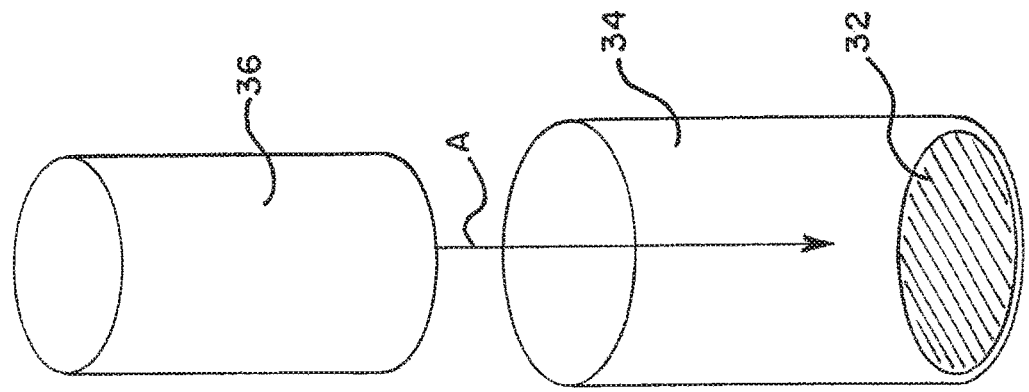
FIG. 6 is an enlarged perspective view of the cup and plug used in the embodiment of FIG. 5.
Figure 5:
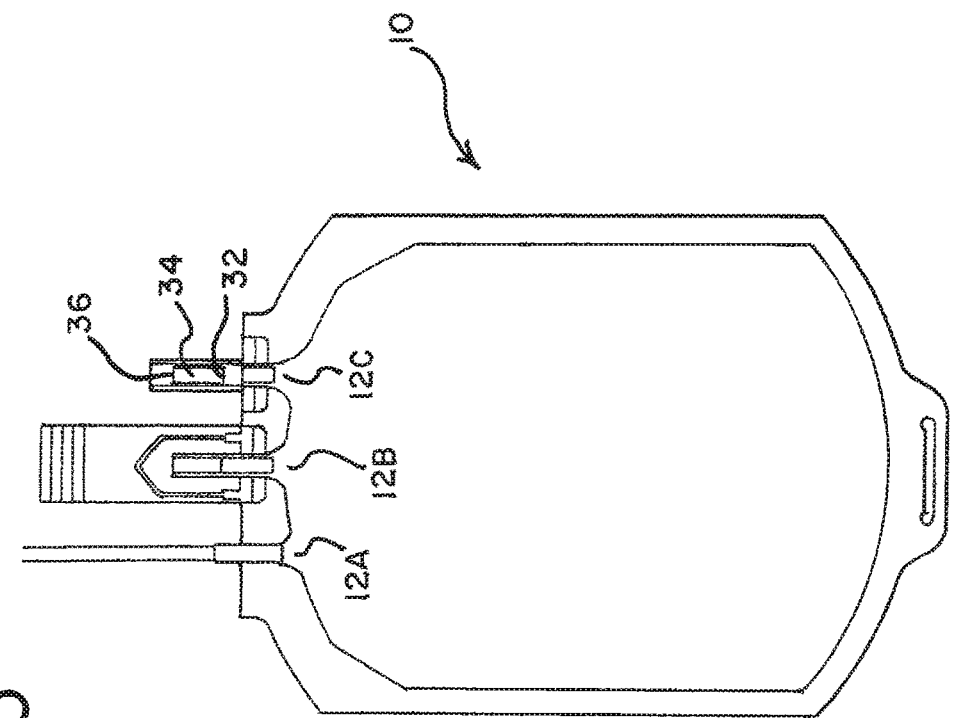
FIG. 5 is a plan view of a blood container, illustrating a still further alternate embodiment of the present subject matter.

FIGS. 5 and 6 illustrate yet another embodiment of the subject matter. In this version an RFID tag 32 is placed inside a hollow, cylindrical cup 34 which has a closed bottom end and an open top end. After insertion of the tag 32 into the cup 34, the cup is closed by a cover or plug 36 inserted into the open top end of the cup in the direction of arrow A (FIG. 6). The cup and plug combination is then attached to port 12C as seen in FIG. 5. Of course an alternate assembly sequence could be used wherein the cup 34 is first attached to the port 12C and then the RFID tag 32 is placed in the cup, after which the plug 36 is inserted to close the cup 34. Optionally the plug 36 could be used in conjunction with some type of adhesive to prevent subsequent removal of the plug. Or some kind of tamper-evident seal could be used with the plug to expose the fact that a plug has been removed. As a further alternative, the cup with RFID tag could be inserted into a tube resembling a port tube and attached to the container but not useful for or intended for accessing the container contents.

The embodiment of FIG. 7 uses a painted RFID tag 38. The tag 38 is an aluminum RFID tag antenna that is painted or stamped directly onto the sheeting of the blood container 10.

FIG. 8 illustrates a further alternate embodiment wherein a free-floating RFID tag 40 is inserted into the interior of the blood container 10. Tag 40 is free to float in the liquid components when the container is filled.

Turning now to a further embodiment of the present subject matter, FIGS. 9-17 illustrate additional configurations of an RFID tag that may be employed with, for example, blood component containers and/or blood collection or processing systems or flow circuits (which may include one or more blood component containers). In these embodiments, the RFID tag is not embedded into the container material or associated with the container label. Instead, the RFID tag is preferably separate from the container but may be irremovably attached to the container. For example, the RFID tag may be attached to a container or associated fluid flow circuit by a hanger or tether, such as a loop or strap, or as part of a component of a flow circuit employed in combination with a blood component container. Such attachment configurations would allow the RFID tag to be used potentially across a wide variety of products or container shapes or configurations, and would also potentially allow for the RFID tag to be positioned in different orientations during use. Further, such configurations may ease life cycle management of RFID features. For example, if RFID devices are improved or modified, the improved versions may be incorporated without necessitating changes to the actual blood component container configuration. In addition, because the configurations set forth below are not part of the container, they may not need to be subjected to or to survive sterilization processes. Also, they could potentially be attached to the container or system at the user site if so desired.

Turning now to the figures, FIG. 9 depicts the upper or open end of a plasma bottle or bottle assembly 50. The plasma bottle 50 is one example of another type of container (in addition to bags or pouches) that is commonly employed in the collection of a blood component—specifically plasma. Typically, such a collection bottle includes a rigid or semi-rigid plastic container body 52, which includes an inlet port 54 at one end. A rigid plastic connector 56 is mounted on and seals the inlet port 54 for connecting the plasma bottle to inlet or outlet flow tubing (not shown). An outer cover or cap 58 is attached to the top of the bottle and encloses the connector. The cover or cap 58 may include a hinged portion that can be opened to allow user access to the plastic connector.

In this embodiment, the RFID tag 60 is configured as a hang tag and includes a read or scan component or region 62 that contains, carries or is otherwise attached to the actual RFID chip, and a hanger or tether 64 such as a strap or loop or tie or other suitable attachment device that substantially permanently attaches the reader component of the RFID tag to a component or part of the plasma bottle 50, such as to the outer cover or cap 58. "Permanent" does not mean that the RFID cannot be removed by any means or method, but that it is permanent within a range of normal usage conditions.

The read component or region 62 may be of any suitable size, shape or material and may mount the RFID chip in any suitable manner that would, of course, permit scanning or reading of the RFID tag and, preferably, could be easily moved as needed for better scanning or reading visibility. It is presently contemplated that the reader component and the tether preferably would be made of any suitable plastic material. They could be integrally molded as one piece or could be separate pieces or even made of different materials, such as a metallic or wire tether and plastic read portion, if desired. In any event, the arrangement of FIG. 9 allows the RFID tag to be permanently attached to the plasma bottle 50 without requiring substantive changes in the manufacture of the bottle itself or the bottle connector, and only limited adaptation of the bottle cap. Should RFID technology change or a different RFID tag be desired, it may be readily accommodated without requiring basic manufacturing changes of the plasma bottle or its associated parts. The hang tag assembly shown in FIG. 9 also lends itself to ready adaptation to other products, potentially reducing the need for a large inventory of differently configured RFID tags.

FIGS. 10-11 illustrate another configuration of an RFID tag 66 employed on the plasma bottle 50. As shown there, the RFID tag has an aperture, such as a generally central aperture 68, that is large enough to fit over the neck of the plasma bottle inlet port 54, and smaller than the connector 56 so as to be permanently captured between them. As specifically illustrated, the RFID tag has a generally annulus or donut shape with an outer circular edge 70 and an inner circular opening edge 72. The inner opening of the RFID tag has a diameter larger than that of the neck of the plasma container inlet port 54 but smaller than the diameter of the connector 56. Accordingly, the RFID tag 66 is permanently captured between the top of the plasma bottle and the underside of the connector. As with the prior embodiment, the RFID tag may be made of any suitable material such as molded plastic, durable fiberboard or other durable material that would withstand the rigors of handling, freezing, thawing and other processes to which the blood component may be subjected. The RFID chip itself could be molded within, adhered to or otherwise carried on the surface of the tag 66 so as to be readily scanned or read by a suitable RFID scanner/reader. The captured annulus shown in FIG. 10 could also be a way to permanently attach a tethered RFID tag, such as shown in FIG. 9, to the plasma bottle, without requiring any adaptation of the cap 58.

FIGS. 12-14 show an RFID tag 74 that comprises a read or scan portion or component 76 that is hingedly connected to a port connector or adaptor 78. The RFID read portion 76, as illustrated, is a generally elongated rectangular portion, although it may be of any suitable shape or size, and carries an RFID chip in any suitable fashion, e.g., by containing it in a pocket, molding it within the portion, or gluing or bonding. The read portion 76 may be of any suitable durable material such as plastic for disposability and low cost, and is preferably flexible and/or molded with or attached to the port connector portion 78 of the RFID tag. As best seen in FIG. 13, the RFID tag 74 preferably has a fold line 80 that allows the read portion 76 to be positioned in different orientations.

As best seen in FIG. 13, the port connector 78 has opposed tubular extensions 82 for connecting inline with any suitable conduit, tube or tubing, such as a plastic fluid flow tubing of a blood bag collection or processing system, or with a blood component container itself. The port connector includes a through lumen or bore 84 that extends through the opposed extensions and forms part of the fluid flow path when attached inline in a flow arrangement, such as with plastic tubing and/or ports. FIG. 13 illustrates the RFID tag connected to flow tubing segments 79. The flow tubing segments may, as mentioned earlier, be part of a blood collection or processing system that includes a blood component container. The tubings may be connected to the port connector extensions 82 in any suitable manner such as adhesive or radio frequency bonding or other. As noted above, the RFID read portion 76 of the tag 74 is preferably hinged to the connector 78 so that the read portion may be positioned in different orientations, as desired, during use for improved reading or scanning.

FIG. 14 shows the RFID tag 74 of FIG. 12, with one extension 82 attached to a blood component container 86 and the opposed extension attached to fluid flow tubing 88. Blood component containers such as blood component pouches, bottles or bags typically including port tubes molded or sealed into one end of the container to provide access for filling the container or for removing the contents. In the illustrated embodiment, one extension 82 of the port connector 78 is sealed into or over the container port tube 90 and the other extension 82 of the port connector is attached to fluid flow tubing 88 through which blood component may flow into or from the container 86.

As may be seen in FIGS. 12-14, the RFID tag embodiment of FIG. 12 provides ready RFID identification without requiring special molding considerations or labeling considerations of the container itself. In the event that the RFID device itself or the technology associated therewith changes, the change can be accommodated in the manufacture of the RFID tag itself and does not require other manufacturing changes of the blood component container or associated fluid flow system.

FIG. 15 illustrates an RFID tag 92 that is of a somewhat different shape than the RFID tag in FIG. 12, but also includes a read or scan portion 94 that carries an RFID chip and a connector 96 having opposed port extensions 98 and a fluid flow lumen 100 therethrough for connecting with tubing or the like. The materials and construction of this embodiment are generally as described above with respect to FIGS. 12-14, except the scan portion in FIG. 15 is preferably but not exclusively smaller, and generally circular or oval. It is anticipated that the RFID tag 92 will most preferably be of one molded plastic construction although other configurations are not excluded. FIG. 16 shows the RFID tag 92 of FIG. 15 being attached to fluid flow tubing segments 102 with each of the extensions 98 of the connector 96 being attached to plastic fluid flow tubing or tubing segments 102 associated with a larger blood component collection system or processing system (not shown).

FIG. 17 shows the RFID tag 92 of FIG. 15 attached to a blood component container 104, wherein one port extension 98 of the connector 96 extends into or over an access port tube 106 of the blood component container, and the other port extension 98 of the connector 96 is attached to fluid flow tubing segment 102. Thus it may be seen that a single RFID tag has multiple product applications, reducing the need for increased inventory of different RFID tags for different situations and/or product designs and reducing handling costs and the risk of human error.

EXAMPLES

Without limiting the foregoing, examples of the present subject matter are found in one or more of various aspects. For example, in a first independent aspect of the present subject matter, a blood component container assembly includes a rigid or semi-rigid blood component container comprising a body, a neck extending from the body and terminating in a port, and a connector mounted in association with the port, and an RFID tag secured to the container.

In accordance with another aspect of the present subject matter, which may be used with the preceding aspect, the RFID tag is secured to the container between the body and the connector.

In accordance with another aspect of the present subject matter, which may be used with any one of the preceding two aspects, the RFID tag includes an aperture sized to receive the neck therethrough and to prevent passage of the container body and connector therethrough.

In accordance with another aspect of the present subject matter, which may be used with any one of the preceding three aspects, the RFID tag extends generally annularly around the neck.

In accordance with another aspect of the present subject matter, which may be used with any one of the preceding four aspects, the RFID tag comprises a generally planar member carrying an RFID circuit.

In accordance with another aspect of the present subject matter, which may be used with any one of the preceding five aspects, the RFID tag comprises a generally annular member including a generally central aperture that is large enough to fit over the neck and smaller than the body or connector so as to be captured between them.

In accordance with another aspect of the present subject matter, which may be used with any one of the preceding six aspects, the RFID tag includes a tether that is secured to the container.

In accordance with another independent aspect of the present subject matter, a blood component container assembly includes a flexible blood component container, a generally tubular member extending from the container, and a RFID tag located within the tubular member.

In accordance with another aspect of the present subject matter, which may be used with the preceding aspect, the RFID tag is carried by a support member that is located within the tubular member.

In accordance with another aspect of the present subject matter, which may be used with the preceding aspect, the support member comprises a molded plastic member.

In accordance with another aspect of the present subject matter, which may be used with any one of the preceding two aspects, the support member includes a receptacle containing the RFID tag.

In accordance with another aspect of the present subject matter, which may be used with any one of the preceding three aspects, the support member comprises a cup having an open end for receiving the RFID tag and a closure sealing the open end to contain the RFID tag within the cup.

In accordance with another aspect of the present subject matter, which may be used with any one of the preceding four aspects, the tubular member has an open end for receiving the RFID tag therein and a closure sealing the open end to contain the RFID tag within the tubular member.

In accordance with another aspect of the present subject matter, which may be used with any one of the preceding five aspects, the support member is a breakaway cannula.

In accordance with another aspect of the present subject matter, which may be used with any one of the preceding six aspects, the tubular member is located within an openable enclosure at one end of the container.

In accordance with another independent aspect of the present subject matter, a blood component container assembly comprises a flexible flood component container, an enclosure formed by peel tabs carried by the container, and an RFID tag enclosed within the enclosure, and the peel tabs are manually openable to allow access to the RFID tag.

In accordance with another independent aspect of the present subject matter, which may be used separately or with any one of the preceding aspects, a blood component container has a wall with an exterior surface, and an RFID antenna is painted, printed or stamped directly onto the exterior surface.

In accordance with another aspect of the present subject matter, which may be used with the preceding aspect, the RFID antenna is aluminum.

In accordance with another aspect of the present subject matter, which may be used with any one of the preceding two aspects, the container comprises a pair of facing flexible plastic sheets and the RFID antenna is printed, stamped or painted directly on a surface of one of the sheets.

In accordance with another independent aspect of the present subject matter, which may be used separately or with any one of the preceding aspects, a method of attaching an RFID tag antenna to a blood component container having an exterior surface comprises painting, printing or stamping an RFID tag antenna directly onto the exterior surface.

In accordance with another independent aspect of the present subject matter, a blood component container assembly includes a blood component container having an internal chamber for receiving a blood component and a RFID tag located within the chamber.

In accordance with another independent aspect of the present subject matter, a blood component container assembly includes a blood component container and an RFID tag secured to the container by a tether.

In accordance with another independent aspect of the present subject matter, an RFID tag for tracking a blood component is provided that includes an RFID scan component and a tether for permanently attaching the scan component to a product.

In accordance with another independent aspect of the present subject matter, an RFID tag is provided for use in association with a blood component flowpath, the tag includes a port connector having a fluid flow lumen extending therethrough for in-line connection in a fluid flow path and an RFID read portion carried by the port connector.

In accordance with another aspect of the present subject matter, which may be used with the preceding aspect, the connector includes opposed extensions for attachment to fluid flow conduits and the lumen extends through the extensions.

In accordance with another aspect of the present subject matter, which may be used with any one of the preceding two aspects, the read portion is flexibly connected to the connector so as to allow the read portion to be positioned in different orientations relative to the connector.

It will be appreciated that the description set forth above has been offered for illustrative purposes only. Other embodiments and other modifications to the device shown and described above will be readily apparent to one skilled in the art and may also be included within the scope of the present disclosure. The above description is not intended to limit the scope of the subject matter of this application, which is as defined in the claims.

What is claimed is:

1. A blood component container assembly including a flexible blood component container and an RFID tag carried by the container, the container comprising facing plastic sheets having outer edges, a peripheral seal peripherally sealing the plastic sheets together to define an interior chamber and to define a plurality of ports extending through the peripheral seal between the interior chamber and exterior of the chamber, and a plurality of separate port tubes, each port tube being associated with one of the plurality of ports, a first one of the plurality of port tubes extending exteriorly from its respective one of the plurality of ports, the first one of the plurality of port tubes having a first end associated with the respective one of the plurality of ports and a second and open end spaced from the first end and spaced from an outer edge of the plastic sheets;
   a separate molded plastic support member located entirely within the first one of the plurality of port tubes;
   the RFID tag being embedded in the support member, and the RFID tag and support member being located entirely within the first one of the plurality of port tubes; and
   the first one of the plurality of port tubes being located in an openable closure at one end of the blood component container.

2. The blood component container assembly of claim 1 in which the support member includes a receptacle containing the RFID tag.

3. The blood component container assembly of claim 2 in which the receptacle comprises a cup having an open end for receiving the RFID tag and a closure sealing the open end to contain the RFID tag within the cup.

4. The blood component container assembly of claim 1 in which the first one of the plurality of port tubes has an open end for receiving the RFID tag therein and a closure sealing the open end to contain the RFID tag within the first one of the plurality of port tubes.

5. The blood component container assembly of claim 1 in which the assembly includes:
   an enclosure extending from the container and formed by peel tabs carried by the container;
   the RFID tag enclosed within the enclosure; and
   the peel tabs being manually openable to allow access to the RFID tag.

6. The blood component container assembly of claim 1 in which the support member is insertable into the first one of the plurality of port tubes.

7. The blood component container assembly of claim 1 in which the support member is sized to fill an inside of the first one of the plurality of port tubes.

8. The blood component container assembly of claim 1 in which the support member may be broken by external manipulation of the first one of the plurality of port tubes.

9. The blood component container assembly of claim 1 further comprising a pierceable diaphragm obstructing flow through at least one port.

10. A blood component container assembly including a flexible blood component container and an RFID tag carried by the container, the container comprising facing plastic sheets having outer edges, a peripheral seal peripherally sealing the plastic sheets together to define an interior chamber and to define a plurality of ports extending through the peripheral seal between the interior chamber and the exterior of the chamber, and a plurality of separate port tubes, each port tube being associated with one of the plurality of ports, a first one of the plurality of port tubes extending exteriorly from its respective one of the plurality of ports, the first one of the plurality of port tubes having a first end associated with the respective one of the plurality of ports and a second and open end spaced from the first end and spaced exteriorly of the interior chamber;
a separate molded plastic support member located entirely within the first one of the plurality of port tubes; and
the RFID tag being embedded in the support member, and the RFID tag and support member being located entirely within the first one of the plurality of port tubes.

11. The blood component container assembly of claim 10 in which the support member may be broken by external manipulation of the first one of the plurality of port tubes.

12. The blood component container assembly of claim 10 further comprising a piercable diaphragm obstructing flow through at least one port.

13. The blood component container assembly of claim 10 in which the support member is sized to fill an inside of the first one of the plurality of port tubes.

* * * * *